United States Patent Office 3,763,294
Patented Oct. 2, 1973

3,763,294
FIRING VITREOUS SILICA ARTICLES WHILE SUPPORTED ON A PERFORATED THIN-WALLED GRAPHITE MANDREL
Carmine A. Nicastro, Jr., Big Flats, Roelant S. L. Vander Noordaa, Corning, and William A. Ward, Painted Post, N.Y., assignors to Corning Glass Works, Corning, N.Y.
Filed June 28, 1971, Ser. No. 157,301
Int. Cl. C04b *33/32, 35/14, 35/60*
U.S. Cl. 264—57
9 Claims

ABSTRACT OF THE DISCLOSURE

Improvement in the step of firing a high purity, close tolerance, vitreous silica article capable of being inside-supported, whereby the article is supported on its inner surface only, in a bottom-end-up position on a perforated, thin-wall graphite support having an outer surface substantially complementary in shape to the inner surface of the article and sintered in the presence of at least one protective gas atmosphere for a time sufficient to completely fuse the article.

BACKGROUND OF THE INVENTION

While commercial vitreous silica articles or forms may be made by a number of different processes, regardless of which process is used, problems have been encountered particularly in making high purity, transparent, vitreous silica crucibles for use by the semiconductor industry in the growing of silicon or other crystals. Not only does this use require extremely high purity but also requires tight dimensional tolerances.

One method of producing these vitreous silica crucibles involves the making of green crucibles, generally either by means of slip-casting or isostatic pressing small particles of vitreous silica, which are thereafter fired to achieve fusing into a finished final part.

Conventional kiln firing of the green articles is not satisfactory, since during this firing the whole article is above its melting point for at least part of the time, which causes slumping and deformation of the article form resulting in subsequent loss of dimensional tolerances.

SUMMARY OF THE INVENTION

This invention solves the previously-mentioned problems in the case of a vitreous silica article having a generally symmetrical shape capable of being inside-supported during the firing step. The article is supported on its inner surface, in a bottom-end-up position, on a perforated thin-wall graphite support wherein the support has an outer surface that is substantially complementary in shape to the inner surface of the article. The article-support assembly is thereafter inserted into a furnace hot zone and very rapidly heated in the presence of at least one protective gas atmosphere to above the melting point of cristobalite for a time sufficient to completely fire the article. The use of a perforated thin graphite mandrel permits gravity stretching of the article over the mandrel to accurately control both the inner and outer diameters as well as the wall thickness of the article. In addition, the thin-wall graphite support not only permits uniform internal and external heating of the article but also permits the escape of any gases between the article-support complementary surfaces. In summary, this invention relates to a process for manufacturing close tolerance, high purity, vitreous silica articles that are capable of being inside-supported, the improvement being in the firing step and includes determining the firing time as a function of article weight, placing the article in a bottom-end-up position on a perforated thin-wall graphite support having an outer surface substantially complementary in shape to the inner surface of the article, inserting the article-support assembly into a furnace hot zone and very rapidly heating this assembly in the presence of at least one protective gas atmosphere to above the melting point of cristobalite for a time sufficient to completely fire the article, while controlling its dimensions.

BRIEF DRAWING DESCRIPTION

FIG. 1 is a partial side elevational view, having portions thereof partly in section, of the firing apparatus for practicing the method of this invention.

FIG. 2 illustrates a typical plot of the firing time as a function of the article weight.

FIG. 3 illustrates a typical firing-cooling cycle obtainable with the apparatus used for practicing the method of this invention.

DESCRIPTION OF THE PREFERRED EMBODIMENTS

A known process for manufacturing vitreous silica articles, such as crucibles, beakers and the like utilizes the following steps:

(1) Washing and drying the vitreous silica tubing cullet,
(2) Dry crushing the cullet,
(3) Separating the washed cullet according to particle size,
(4) Wet grinding the desired size fraction to produce vitreous silica slip,
(5) Drain-casting the slip into a mold,
(6) Drying the slip cast green article,
(7) Firing the article,
(8) Cooling the fired article, and
(9) Post-finishing the fired article.

This known process for manufacturing vitreous silica articles except for the unique way hereinafter described for firing the vitreous silica articles, is common practice in slip-casting work.

Other processes, besides slip-casting, commonly used for forming green bodies of vitreous silica particles include isostatic pressing and extrusion.

Referring now to the drawings in detail, FIG. 1 depicts the firing, fusing or sintering apparatus 10 used for practicing the process or method of this invention. A slip-cast-and-dried green article of vitreous silica particles is shown in FIG. 1 in the shape of an inverted crucible 12. Crucible 12 has generally hemispherical bottom portion 14, a generally cylindrical body portion 16, as well as inner peripheral surface 18, outer peripheral surface 20 and annular upper end surface 22. Crucible 12 is supported on at least a portion of its inner surface 18, more particularly, on at least a portion of the inner area of bottom portion 14, on a perforated thin-wall graphite support 24, in a bottom-up position, thereby having its longitudinal axis in a vertical position.

Perforated thin-wall graphite support 24, which is made of a graphite material preferably having a density in excess of 1.5 grams per cubic centimeter, is shown as having a shape corresponding to an inverted crucible 12. Support 24 thus has a generally hemispherical bottom portion 26, cylindrical body portion 28, as well as inner peripheral surface 30, outer peripheral surface 32 and annular upper end surface 34. The support or mandrel outer peripheral surface 32 is substantially complementary in shape to crucible inner peripheral surface 18 as will be explained in more detail later. The axial extent of mandrel body portion 28 generally is greater than that of crucible body portion 16. Mandrel 24 has a substantially uniform wall dimension, the thickness 31 of which is limited only by the mechanical strength of the graphite material. The mechanical strength of course is somewhat dependent on the relative size of the mandrel, with larger sizes requiring a heavier wall, however, even a nominally six inch diameter mandrel can have a wall thickness of only 0.100 inch, for example. Mandrel 24 also has a plurality of apertures or through-bores 33 preferably generally evenly distributed. Apertures or perforations 33 are generally in the range of 0.040 to 0.125 inch in diameter and there should be a minimum of one perforation for approximately every three square inches of mandrel outer peripheral surface 32.

Inverted mandrel 24 is supported on its annular upper end surface 34 by circular, base plate 36 of refractory material. Base plate 36, which has a recessed portion 38 abutting an annular band portion of mandrel inner peripheral surface 30, also has a tapered central aperture 40 and at least one further axial aperture 42.

Horizontal base plate 36 is positioned on the upper, tapered, closed-end portion 46 of rod 44, with portion 46 being retained in base plate central aperture 40. Vertical rod 44 which is a double-walled metal tube, is preferably water-cooled to eliminate possible warpage tendencies due to the influence of heat.

Rod 44 is vertically movable in order to insert and remove the crucible-mandrel assembly into and out of a sintering furnace 50. Furnace 50, which by itself forms no part of this invention and thus is only schematically shown as a vertical furnace, essentially consists of an induction or resistance-fired generally cylindrical hot zone 52 and a generally cylindrical water cooled muffle 54 (not fully shown). Hot zone 52 has one or more upper inlet pipes 56 used for the introduction of protective gas atmospheres into heating zone 52.

The following example in conjunction with FIG. 3, which depicts a typical firing-cooling cycle for a generally flat-bottomed crucible having a six inch outside diameter, sets forth the details of the crucible and the apparatus used in practicing the method of this invention.

EXAMPLE

Crucible green dimensions (inches):
  Outside diameter _____ 6.555
  Inside diameter _____ 6.295/6.375
  Wall thickness _____ 0.090/0.130
  Length _____ 6
Weight _____grams__ 435±25

Crucible fired dimensions (inches):
  Outside diameter _____ 5.940/6.000
  Inside diameter _____ 5.750
  Wall thickness _____ 0.080/0.100
  Length—fired _____ 5.7–7.0
  Length—cut _____ 4.75±0.068

Mandrel dimensions (inches):
  Outside diameter _____ 5.720±.001
  Wall thickness _____ .115–.135
  Length _____ 7±0.068

The process of this invention is usable for sintering, firing or fusing any vitreous silica article having a generally symmetrical shape that is capable of being inside supported during the firing step.

First, the article to be fired is weighed to the nearest gram, with this green weight being used to determine the required firing time. FIG. 2 illustrates a typical plot of the firing time as a function of article weight for a fired six inch (O.D.) crucible. As noted in the given example, the dry green weight of a six inch crucible is 435±25 grams, which when read on the FIG. 2 graph gives a firing time (in seconds) of 189±13 i.e. a range from 176 to 202 seconds. Thus, for instance, a crucible weighing exactly 435 grams would require a total sintering time of 189 seconds. Graphs similar to FIG. 2 are experimentally determined for each article size, with smaller sizes requiring less overall time and larger sizes requiring more overall time. The preferred firing time used in the process of this invention preferably is in the range from 3 to 5 seconds per every 10 grams of article weight.

Secondly, the article to be fired, crucible 12 in this example, is placed in a bottom-up position on perforated hollow graphite mandrel 24, with mandrel outer peripheral surface 32 being substantially complementary in shape to crucible inner peripheral surface 18. At this time, due to the differences in dimensions, i.e., the green crucible inside diameter of 6.295/6.375 and the mandrel outside diameter of 5.720, crucible 12 is readily slipped over mandrel 24 with contact being made mainly between portions of crucible bottom portion 14 and mandrel bottom portion 26.

Next, the article-support or crucible-mandrel assembly is inserted into hot zone 52 of furnace 50. The weighing, loading and inserting steps used in practicing the method of this invention are denominated as subcycle 1 in the typical firing-cooling cycle, for a six inch diameter crucible, shown in FIG. 3.

Firing of the article or crucible in furnace 50 is accomplished as rapidly as possible, with as previously noted, the firing time being a function of article weight. The articles are therefore sintered for a given time and thus to a given temperature, although the sintering furnace is generally kept at a higher temperature. Sintering takes place in a temperature range and thus the furnace temperature is kept in the range from about 1725° C. to about 2200° C., with the preferred range being from 1850° C. to 2050° C. It should be noted that the higher the furnace temperature is, the shorter the heating time becomes, but also the higher the furnace temperature is, the more critical the heating time becomes, especially with respect to the control of article dimensions.

The process of this invention encompasses the production of both transparent and non-transparent or opaque vitreous silica articles. The sintering of a non-transparent vitreous silica article requires the use of only one protective gas atmosphere, such as helium. However, the sintering of transparent vitreous silica articles requires the use of two protective gas atmospheres, namely a first protective gas atmosphere such as helium and then a subsequent second protective gas atmosphere such as argon. Sintering in the presence of the first atmosphere is accomplished at a first temperature below the melting point of cristobalite for a time sufficient to effect at least a partial sintering of the article, with this first temperature preferably being in the range of about 1600° C. to about 1725° C.

Sintering in the presence of the second atmosphere is accomplished by heating the article from the first temperature to a second temperature of above the melting point of cristobalite, for a time sufficient to substantially completely sinter the article (2.2 grams/cubic centimeter), with this second temperature preferably being in the range of about 1730° C. to about 2200° C. The method of making transparent vitreous silica bodies, that are virtually free of occluded bubbles, by means of firing in two successive different protective gas atmospheres is thoroughly described in our co-pending U.S. application Ser. No. 157,710 filed June 28, 1971 and also assigned to the assignee of this invention.

It should be noted that the sintering, even when using two atmospheres, is continuous. The firing of a transparent vitreous silica article (using two gas atmospheres) is dominated by subcycles 2 to 5 in FIG. 3. If a non-transparent article is desired then heating subcycles 2 and 4 would be combined into a single subcycle and atmosphere subcycles 3 and 5 would also be combined into a single subcycle.

Upon completion of the sintering cycle(s) the fused article (on the mandrel) is lowered from furnace hot zone 52 into muffle 54 for cooling prior to removal from the furnace. This cooling is shown as subcycle 6 in FIG. 3.

During the firing subcycle(s), the graphite mandrel temporarily expands approximately 0.5 percent while the green vitreous silica article shrinks approximately seven percent. The respective dimensions of the article and mandrel are selected so that during the firing cycle there is an interference fit between article-mandrel complementary surface so as to cause conformation of the article inside surface to the support outer surface, i.e. crucible inner surface 18 conforms to mandrel outer surface 32. This interference-fit relationship therefore accurately controls the inside diameter of the article. Since the furnace temperature is kept higher than the required sintering temperature the article also starts to stretch or sag slightly under the influence of gravity, i.e. the article is stretched over the support and the wall thickness starts to thin out. Thus, the symmetrical body portion of the article i.e., crucible cylindrical body portion 16 starts to elongate, with the degree of elongation being a function of sintering time which in turn is a function of article green weight. In referring back to the given example it may be seen that the fired or sintered length of the crucible may vary anywhere from 5.7 to 7 inches in order to achieve the required outside diameter and wall thickness limits. Since the crucible green length is 6 inches and the fired length varies from 5.7 to 7 inches, it should be apparent that when firing a minimum weight (410 grams) crucible there will actually be a decrease in length due to the approximately 7 percent shrinkage, while a maximum weight (460 grams) crucible will produce a one inch increase in length due to the extra weight, with the outside diameters, inside diameters and wall thickness of the two crucibles, being comparable. In the case of a crucible because it is desired to obtain a specified inside diameter, outside diameter and wall thickness, the as-fired length may vary considerably due to the initial weight variations, with the crucible then being cut to the desired length upon cooling. It must also be noted that upon cooling the mandrel will again shrink to its original dimension thus allowing ready removal of the fired article. Stretching of the article outer surface also tend to diminish any fabrication marks or scratches present thereon.

The graphite support, by reason of its thinness and consequent behavior as a minimum heat sink allows uniform heating of both the interior and exterior surfaces of the supported article, in addition to acting as a complementary support for the inside surface of the article. Apertures 33 in support 24 permit the escape of any gases tending to be trapped between the complementary article-support surfaces. During a portion of the sintering cycle, in the production of transparent vitreous silica articles, many bubbles are formed in pores within the article itself, which bubbles, as sintering progresses, must escape from the pores in order to achieve transparency. It is the function of apertures 33 in support 24 to permit the ready removal of these bubbles from the inner peripheral surface of the article being sintered.

Thus, the use of perforated thin wall supports permits:

(1) Rapid heating of the article being sintered— for instance, in the given example, the typical sintering time for the six inch diameter crucible is only 180 seconds (subcycles 2 and 4 in FIG. 4).

(2) Uniform heating—the mandrel quickly comes up to equilibrium and permits equalization of the firing temperature on both the inner and outer surfaces of the mandrel, with even temperatures being essential for obtaining transparent bubble-free articles.

(3) The use of graphite as a mandrel material—the heating is so rapid that the vitreous silica articles do not have time to react with the mandrel material; up to about 350 articles may be sintered on one graphite mandrel before it starts to form silicon carbide.

(4) Precise inside diameter dimensions—since the article being sintered conforms to the complementary outside surface of the mandrel.

(5) Escape of evolved gases—the use of multiple apertures prevents entrapment of gases between the complementary article-support surfaces.

Depending on the purity of the starting materials, i.e. the silica particles, it may be desirable prior to the firing step to initially calcine the green vitreous silica bodies for several hours at a temperature of not less than 750° C. to burn off most of any deleterious impurities possibly present therein.

It should also be noted that because of the very short firing times and the absence of wetting between the support and the article being sintered there is no problem of possible contamination of the article inner surface.

Furthermore, the method of this invention is not limited to crucibles but may also readily be used to produce other vitreous silica articles having generally symmetrical shapes, such as for example cones, breakers, or cylinders closed on one end, just to name a few. In addition, this unique firing step improvement may be utilized on any green vitreous silica article regardless of its production method, be it slip-casting, extrusion, pressing or the like, with the silica particles being selected from the group consisting of vitreous silica and glass having a $SiO_2$ content of at least 90%. Heating methods other than induction heating may also be utilized.

While this invention has been described in connection with possible forms or embodiments thereof, it is to be understood that the present disclosure is illustrative rather than restrictive and that changes or modifications may be resorted to without departing from the spirit of the invention.

We claim:

1. In a process for manufacturing a close tolerance, high purity, transparent vitreous silica article having a generally symmetrical shape that is capable of being inside-supported during the firing step, said process having the initial steps of washing, drying, crushing, screening and milling of vitreous silica cullet to produce a slip which is subsequently processed from a slip-cast green article into a fused, transparent, vitreous silica article by the process steps of drain casting, drying, firing, cooling and post-finishing, the improvement comprising during the step of firing the substeps of:

(a) determining the required firing time as a function of green article weight for a given furnace temperature in the range from about 1750° C. to about 2200° C. wherein said firing time is in the range of from about 0.3 to about 0.5 seconds per gram of green article weight;

(b) supporting said green article on at least a portion of its inner surface only, by placing it in a bottom-end-up position on a thin-wall graphite support having:

($b_1$) a density of at least 1.5 grams per cubic centimeter;

($b_2$) a plurality of perforations, with the diameter of each perforation being in the range from about 0.040 to about 0.125 inch;

($b_3$) a wall dimension whose thinness is limited only by the mechanical strength of the graphite material; and ($b_4$) an outer surface substantially complementary in shape to the inner surface of said article;

(c) inserting said article-support assembly into a furnace hot zone;

(d) initially heating said article-support assembly in the presence of a helium gas atmosphere to a temperature below the melting point of cristobalite for a time sufficient to effect at least partial firing of said article; and (e) finally heating said article support assembly in the presence of an argon gas atmosphere from below the melting point of cristobalite to above the melting point of cristobalite for a time sufficient for concurrently completely firing said article and gravity stretching said article over said graphite support to accurately control the inner and outer diameters as well as the wall thickness of said article, with the respective dimensions of said article and support being selected so that prior to said firing step there is a loose slip fit between said article and said support, while during said firing step there is a slight interference fit between said article-support complementary surface so as to cause substantial conformation of the article inside surface to the support outer surface, said perforated thin-wall graphite support in addition thereto not only allowing uniform internal and external heating of said article, but also permitting the escape of any gases between said article-support complementary surfaces.

2. The process of claim 1 with the additional initial substep of calcining said article for about two hours at a temperature of not less than 750° C. to burn off most of any deleterious impurities possibly present therein.

3. The process of claim 1 wherein said transparent vitreous silica article is a crucible.

4. The process of claim 1 wherein said perforated thin-wall graphite support is a hollow mandrel having a substantially uniform wall dimension.

5. The process of claim 1 wherein during said initial and final heating substeps said slight interference fit between said article-support complementary surfaces, so as to cause conformation of said article inside surface to said support outer surface is due to the shrinkage of said article and the expansion of said graphite support.

6. In a process for manufacturing a close tolerance high purity non-transparent or opaque vitreous silica article having a generally symmetrical shape that is capable of being inside-supported during the firing step, said process having the initial steps of washing, drying, crushing, screening and milling of vitreous silica cullet to produce a slip which is subsequently processed from a slip-cast green article into a fused article by the process step of drain casting, drying, firing, cooling and post-finishing, the improvement comprising during the step of firing the substeps of:
(a) calcining said article for about two hours at a temperature of not less than 750° C. to burn off most of any deleterious impurities possibly present therein;
(b) determining the required firing time as a function of article weight at a predetermined furnace temperature in the range from about 1750° C. to about 2200° C. wherein said firing time is in the range of from about 0.3 to about 0.5 second per gram of green article weight;
(c) supporting said green article on at least a portion of its inner surface only, by placing it in a bottom-end-up position on a thin-wall graphite support having:
($c_1$) a density of at least 1.5 grams per cubic centimeter;
($c_2$) a plurality of perforations, with the diameter of each perforation being in the range from about 0.040 to about 0.125 inch;
($c_3$) a wall dimension whose thinness is limited only by the mechanical strength of the graphite material; and
($c_4$) an outer surface substantially complementary in shape to the inner surface of said article;
(d) inserting said article-support assembly into a furnace hot zone; and
(e) rapidly heating said article-support assembly in the presence of at least one gas atmosphere selected from the group consisting of helium and argon to a temperature in the range of about 1725° C. to 2050° C. for a time sufficient to concurrently substantially completely fuse said article and gravity-stretch said article over said support to thereby accurately control the inside and outside diameters as well as the wall thickness of said article, with the respective dimensions of said article and support being selected so that prior to said firing step there is a loose slip fit between said article and said support, while during said firing step there is a slight interference fit between said article-support complementary surface so as to cause substantial conformation of the article inside surface to the support outer surface, said perforated thin-wall graphite support in addition thereto not only allowing uniform internal and external heating of said article but also permitting the escape of any evolved gases tending to be trapped between said article-support complementary surfaces.

7. The process of claim 6 wherein said opaque vitreous silica article is a crucible.

8. In a process for manufacturing a close tolerance, high purity, vitreous silica article having a generally symmetrical shape that is capable of being inside-supported during the firing step, said process having the initial step of forming a green body of silica particles, selected from the group consisting of vitreous silica and glass having a $SiO_2$ content of at least 90%, which is subsequently processed into a sintered, vitreous silica article by the process steps of sintering, cooling and post-finishing, the improvement comprising during the step of sintering the substeps of:
(a) determining the required sintering time as a function of article weight, with said time being in the range from about 0.3 to about 0.5 second per gram of article weight, for a given furnace temperature;
(b) supporting said green article on at least a portion of its inner surface only, by placing it in a bottom-end-up position on a thin-wall graphite support having:
($b_1$) a density of at least 1.5 grams per cubic centimeter;
($b_2$) a plurality of perforations, with the diameter of each perforation being in the range from about 0.04 to about 0.125 inch;
($b_3$) a wall dimension whose thinness is limited only by the mechanical strength of the graphite material; and
($b_4$) an outer surface substantially complementary in shape to the inner surface of said article;
(c) inserting said article-support assembly into a furnace hot zone;
(d) initially sintering said article-support assembly by rapidly heating it in the presence of a helium gas atmosphere to a first temperature below the melting point of cristobalite for a time sufficient to effect at least a partial sintering of said article; and
(e) finally sintering said article-support assembly by rapidly heating it in the presence of an argon gas atmosphere from said first temperature below the melting point of cristobalite to a second temperature above the melting point of cristobalite for a time sufficient for concurrently completely firing said article and gravity stretching said article over said graphite support to accurately control the inner and outer diameters as well as the wall thickness of said article, with the respective dimensions of said article and support being selected so that prior to said firing step there is a loose slip fit between said article and said support, while during said firing step there is a slight interference fit between said article-support complementary surface so as to cause substantial conformation of the article inside surface to the support outer surface, said perforated thin-wall graphite support in addition thereto not only allowing uniform internal and external heating of said article, but also permitting the escape of any gases between said article-support complementary surfaces.

9. The process of claim 8 wherein said given furnace temperature is in the range from about 1750° C. to about 2200° C., said first temperature is in the range of about 1600° C. to about 1725° C. and said second temperature is in the range of about 1730° C. to about 2050° C.

References Cited

UNITED STATES PATENTS

| | | | |
|---|---|---|---|
| 3,619,440 | 11/1971 | Gray | 264—332 |
| 3,620,702 | 11/1971 | De Kalb et al. | 264—332 |
| 3,460,926 | 8/1969 | Weaver | 264—81 |
| 3,396,220 | 8/1968 | Densnap et al. | 264—67 |
| 3,534,131 | 10/1970 | Gebler et al. | 264—59 |
| 3,576,932 | 4/1971 | Biddulph | 264—332 |
| 3,609,829 | 10/1971 | Carrell et al. | 264—81 |
| 3,644,607 | 2/1972 | Roques et al. | 264—332 |

JOHN H. MILLER, Primary Examiner

U.S. Cl. X.R.

65—32, 33; 264—65, 66, 332